United States Patent [19]

Collins

[11] 4,328,054
[45] May 4, 1982

[54] SPLICING APPARATUS

[76] Inventor: Stephen Collins, 5 Templar St., London, England

[21] Appl. No.: 179,175

[22] Filed: Aug. 18, 1980

[30] Foreign Application Priority Data

Aug. 23, 1979 [GB] United Kingdom ............... 29477/79
May 29, 1980 [GB] United Kingdom ............... 17656/80

[51] Int. Cl.³ ......................... B31F 5/06; G03D 15/04
[52] U.S. Cl. .................................... 156/159; 156/258; 156/304.3; 156/304.5; 156/505; 156/541
[58] Field of Search ..................... 156/159, 157, 304.3, 156/505, 506, 541, 258, 304.5

[56] References Cited

U.S. PATENT DOCUMENTS

| 2,842,184 | 7/1958 | Manchester | 156/506 |
| 3,461,022 | 8/1969 | Jorgensen | 156/505 |
| 3,741,847 | 6/1973 | Yo Sato | 156/541 |

FOREIGN PATENT DOCUMENTS 1597661  5/1970  Fed. Rep. of Germany ...... 156/159

Primary Examiner—Michael G. Wityshyn
Attorney, Agent, or Firm—Murray and Whisenhunt

[57] ABSTRACT

Apparatus is provided for joining strip material, such as magnetic recording tape, comprising two pivotally mounted cutting plates carried by a support, having cooperating cutting edges, said plates having aligned grooves formed at 45° to the cutting edges for reception of the strip material to be joined. In use the strip to be cut is placed in the groove of one plate, relative movement is effected between the two plates to cut the strip at a first position to produce two cut ends, a first cut end is retained in the groove of said one plate and moved relative to the other plate, the second cut end is placed in the groove of the other plate, relative movement between the two plates is again effected to cut the strip material at a second position and to bring the ends of the strip material remaining in the grooves into abutting disposition for application of an adhesive joining strip. Preferably the apparatus includes means for storing and dispensing said strips, whereby each strip of adhesive tape is automatically brought into alignment with each successive two ends of said strip material to be joined.

11 Claims, 6 Drawing Figures

SPLICING APPARATUS

BACKGROUND TO THE INVENTION

This invention relates to apparatus for joining together strip materials and is particularly applicable but not limited to the joining of magnetic recording tape.

STATEMENT OF PRIOR ART

It is known to join magnetic recording tape by positioning the ends to be joined, which have been manually cut with a razor blade, within a longitudinally formed channel within a metal block, manually removing and cutting a length of single-sided adhesive tape from a roll of the material, manually laying the adhesive tape generally longitudinally over the recording tape ends to be joined so as to bridge them, and manually pressing the adhesive side of the tape into contact with the ends to be joined. This known method is time consuming.

OBJECT OF THE INVENTION

Accordingly an object of the present invention is to provide an apparatus for facilitating the rapid joining of strip materials. A further object is to provide an apparatus for automatically dispensing adhesive tape lengths that are brought into contact with the ends of the strip materials to be joined. The apparatus is particularly useful to editors of magnetic tape and film.

SUMMARY OF THE INVENTION

According to the invention there is provided a method of joining together strip materials comprising providing a support member having mounted thereon a pair of cooperating cutting plates having aligned grooves formed respectively therein, placing a strip in the groove of one plate, effecting relative movement between the two plates to cut the strip at a first position to produce two cut ends, permitting a first cut end to be retained in the groove of said one plate, effecting movement of said one plate relative to the other plate in a direction to bring the groove of said one plate out of alignment with the groove of the other plate, placing the second cut end in the groove of the other plate, effecting relative movement between the two plates again to cut the strip material at a second position and to bring the ends of the strip material remaining in the grooves into abutting disposition, and applying an adhesive strip to the abutting ends.

Further according to the invention there is provided apparatus for joining strip material, such as magnetic recording tape, comprising a support and two pivotally mounted cutting plates carried by said support, having cooperating cutting edges, said plates having aligned grooves formed respectively therein transversely of the cutting edges of said plates for reception of the strip material to be joined, whereby in use the strip to be cut is placed in the groove of one plate, relative movement is effected between the two plates to cut the strip at a first position to produce two cut ends, a first cut end is retained in the groove of said one plate and moved relative to the other plate in a direction to bring said first cut end out of alignment with the groove of the other plate, the second cut end is placed in the groove of the other plate, relative movement between the two plates is again effected to cut the strip material at a second position and to bring the ends of the strip material remaining in the grooves into abutting disposition for application of an adhesive joining strip.

Further according to the invention the apparatus includes means for storing strips of adhesive tape supported on a carrier tape, means for dispensing said strips in turn to said strip material longitudinally of the strip material to be joined, transport means for intermittently transporting said carrier tape, pressure means for applying pressure to the dispensed strip of adhesive tape to apply the latter to said strip material on relative movement between said pressure means and one of said plates, and actuating means engageable with one or other of the plates, on relative movement between said one plate and said pressure means, to transport and dispense said carrier tape, whereby each strip of adhesive tape is automatically brought into alignment with each successive two ends of said strip material to be joined.

The carrier tape and adhesive strips may be formed on a continuous roll by automatically and successively cutting or stamping a plurality of lengths from an adhesive layer mounted on a continuous roll of release backing paper (carrier). The lengths of adhesive tape are of a width that is equal to or less than the width of said strip material.

BRIEF DESCRIPTION OF DRAWINGS

The invention will now be described by way of example with reference to the accompanying drawings in which.

DESCRIPTION OF PREFERRED EMBODIMENTS

Figure 1:
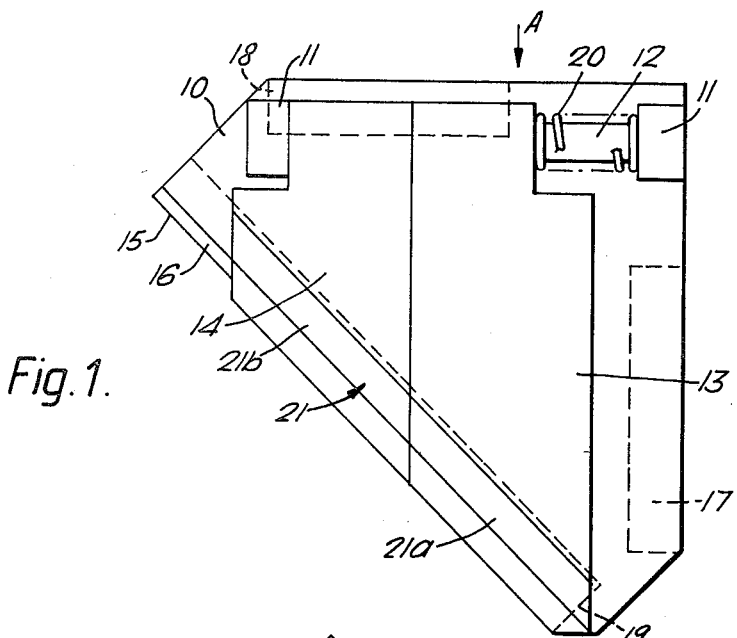
FIG. 1 is a plan view of a simplified form of the invention.

In the arrangement shown in FIG. 1 there is provided a support 10 of substantially right triangular configuration in plan having lugs 11 upstanding thereon carrying a shaft 12 disposed parallel to one side of the support about which shaft pivot a pair of cooperating cutting plates 13, 14. The ends of the plates 13, 14 terminate in oblique edges which are in alignment with each other and lie parallel to the hypotenuse side 15 of the support 10 at the edge of which there is provided an upstanding lip 16 to support the ends of the plates 13, 14 away from the upper surface of the support 10. A space is thereby formed between the plates 13, 14 and the support 10 through which cut pieces of tape may pass unhindered. The support may in this example be mounted on legs 17, 18 and 19.

The two plates are urged together by a spring 20 carried on the shaft 12 between one of the lugs 11 and the plate 13. The spring ensures that the edges of the plates 13, 14 are maintained in contact and are capable of effecting a scissors like shearing action. The contacting edges of the plates may be slightly raked to ensure that the leading cutting edges engage together to produce a sharp shearing action.

A groove 21 is formed in the plates 13, 14 close to the distal ends of the said plates, and parallel to the side 15 i.e. the groove is 45° to the cutting edges of the two plates. The parts 21a and 21b of the groove 21 are shaped to grip gently the magnetic tape to be spliced and are accordingly both defined in cross-section by a slightly concave bottom and sides which taper inwardly from the bottom upwardly.

In use one of the plates, 14, is pivoted upwardly to a substantially vertical position and the magnetic tape to be edited is placed oxide downwardly in the groove 21a with a first selected marked point at which the cut is to be made aligned with the cutting edge of the plate 13. The plate 14 is lowered and shearing of the tape takes place. The plate 13 is then raised carrying with it the first of the cut ends of the tape. The second cut end of the tape is withdrawn from beneath the plate 14 and placed in the groove 21b in the plate 14 with a second selected marked point aligned with the cutting edge of the plate 14. The plate 13 will now be brought down firmly by the user to effect the second cut. When the plate arrives in its lowermost rest position the first of the cut ends will exactly align with the remaining part of the second cut end i.e. laterally, vertically and with the 45° cut surfaces abutting each other.

A strip of white adhesive plastic tape preferably 25 mm long and having a width equal to or just less than the width of the magnetic tape, say 6 mm, is peeled off a backing strip and placed along the groove over the two ends to effect splicing of the tape.

Figure 2:
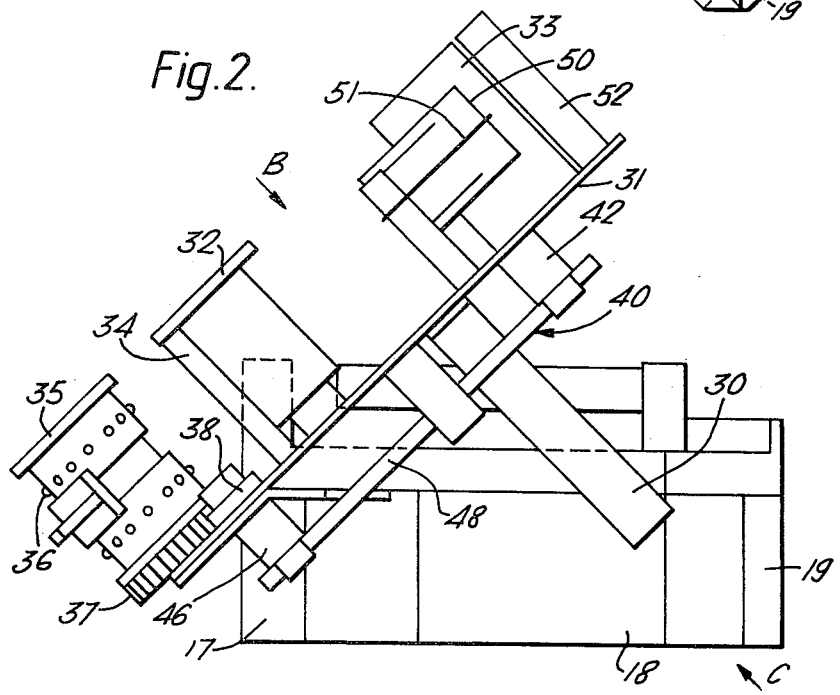
FIG. 2 is a rear elevation in the direction of the arrow A in FIG. 1, showing additionally an automatic tape feed and dispensing device.
Figure 3:
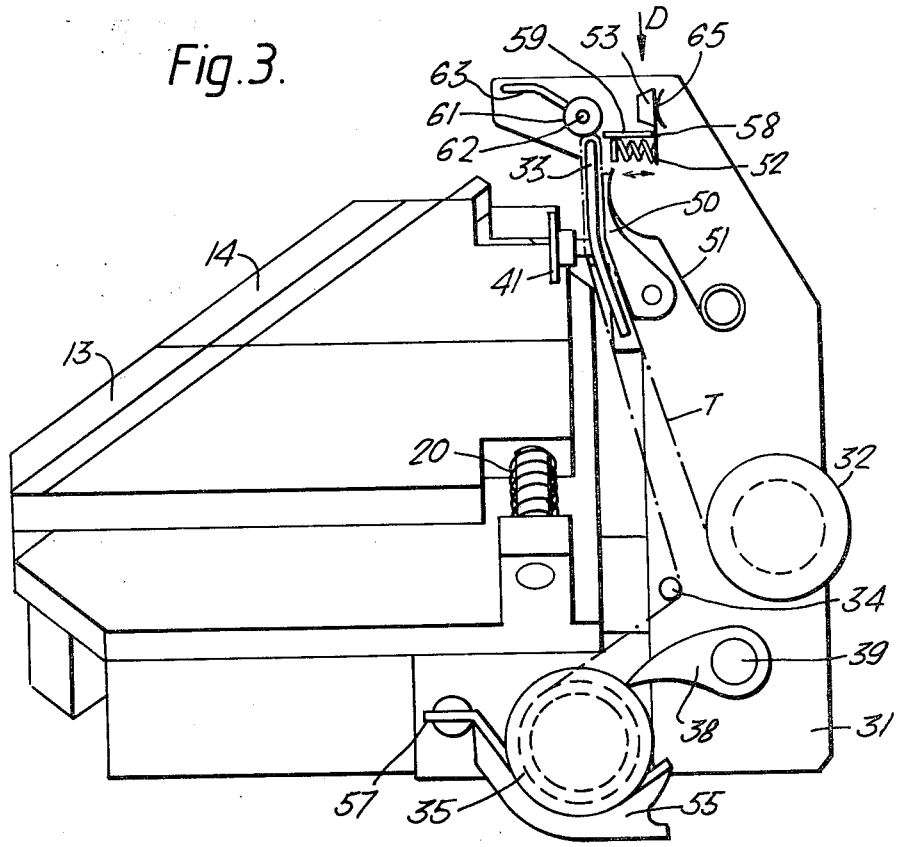
FIG. 3 is an elevation viewed in the direction of arrow B in FIG. 2.
Figure 4:
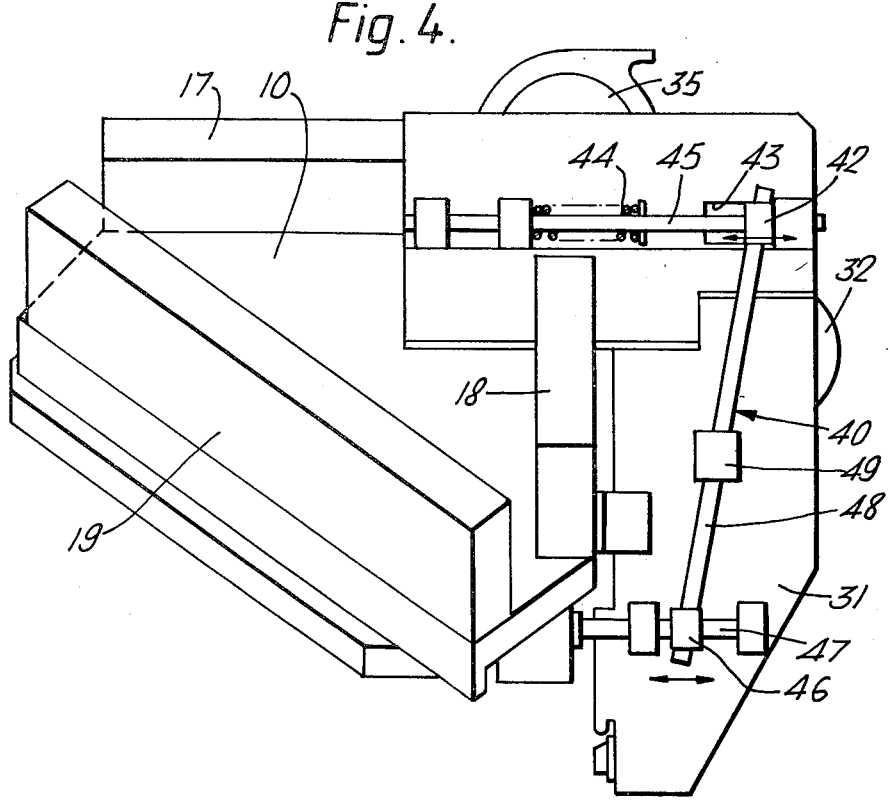
FIG. 4 is an underview taken in the direction of arrow C in FIG. 2.

The embodiment shown in FIGS. 2, 3 and 4 includes means for semi-automatically dispensing and applying lengths of adhesive tape as each splice is made. The same support and cutting plates are provided as disclosed in the example of FIG. 1. The adhesive tape dispensing and supplying means is constructed as a cassette which may be pivotally mounted on the support or may be carried on a fixed bracket. It is a matter of preference which arrangement is chosen. It is essential that relative movement between the plates and the cassette be possible to deliver a length of adhesive tape to the magnetic tape at the join. In the case where the cassette is pivoted the latter may be brought down by the operator after the sequence of cutting has been followed as described above. The action of bringing down the cassette effects both the dispensing and application of the adhesive tape and transportation of the carrier for the adhesive tape lengths.

However, the preferred arrangement shown in FIGS. 2, 3 and 4 is constructed with a fixed cassette in which the operator raises either plate to bring the magnetic tape up to receive a length of adhesive tape.

To the support 10 there is obliquely attached a bracket 30 which carries a mounting plate 31 for the cassette assembly comprising (in the feed direction) a feed spool 32, a delivery plate 33, a spring-loaded tensioning rod 34, and a take-up spool 35. A further plate substantially identical to plate 31 may be provided parallel to the plate 31 whereby the various spindles of the components of the transport mechanism can be supported between the plates. Alternatively a plastics cover may be provided which may have a wall to do the job of said further plate. For the sake of clarity the further plate has been omitted from the drawings. Also included in the cassette is a transport mechanism for the adhesive tape carrier which comprises a sprocket wheel 36 forming part of said take-up spool 35, a ratchet wheel 37 drivably connected to said spool 35 by means of a slipping clutch (not shown), a pawl 38 pivotally mounted on a shaft 39 extending through said mounting plate 31 and a linkage system 40 carried on the underside of said plate 31 drivable by means of a plunger 41.

The linkage system 40 (see FIG. 4) comprises a pivot block 42 slidable in a guide slot 43 against the action of a spring 44 carried by a rod 45, a pivot block 46 connected through an opening in the plate 31 with the plunger 41 and freely movable on a shaft 47, and a lever 48 pivotally mounted approximately midway between its ends on the plate 31 by a block 49 linking the two pivot blocks 42 and 46.

As seen in FIG. 3 a tape T comprising a carrier and a series of pre-cut lengths of plastic adhesive strips (each of a dimension described above) passes from the spool 32 over the edge of the delivery plate 33, around the tensioning rod 34 and thereafter to the take-up spool 35. The tape T is pressed into contact with the plate 33 by a pivoted shoe 50 (or roller) urged by the spring 51 and serves to brake the tape during transport.

At the take-up spool 35 there is provided a spring-urged guide 55 carried on a post 57 fixed to the plate 31. This ensures that the tape carrier is held firmly against the sprocket wheel 36 during transport.

Adjacent the edge of the delivery plate 33 there is provided a presser plate 52 carrying a rubber anvil 53. Buffer springs 56 are located between the presser plate 52 and end stops 54 which extend from the plates 31 and 60. A thumb plate 65 is attached to the presser plate 52. The front faces of the oblique edges of the plates 13 and 14 may be inclined to the vertical or may be curved so as to be more easily gripped and moved by the fingers. In combination said front faces and the thumb plate 65 provide surfaces which can be easily gripped between thumb and fingers. The plate 52 is provided at each side with pins 58 which respectively engage a pair of horizontal guide slots 59 formed in the plate 31 and a support bracket 60 attached to the plate 31.

For the purpose of guiding the adhesive tape length detached from its carrier by the plate 33 and to prevent the length from curling away from the desired orientation for application to the magnetic tape there are provided a set of wheels 61 rotatably mounted on a rod 62 which passes through a slot 63 formed in the plate 31. The slot 63 has an inclined portion end at its upper and lower ends in short horizontal positions. The rod 62 is drivably connected to one of the pins 58 by a link 64.

The cutting operation in the second embodiment follows precisely the same course as in the first embodiment. In the semi-automatic arrangement, just before the end of the raising stroke of the plate 13 after a first cutting operation, the latter engages the plunger 41 thus causing transport of the tape T by way of the transmission mechanism 40 and the pawl 38 which rotates the ratchet wheel 37 and consequently the take-up spool 35 by an amount equivalent to the width (6 mm) of a single strip of the adhesive tape. On further movement of the plate 13 the first cut end of the magnetic tape is brought into contact with an adhesive tape length which during the transport movement has peeled off the carrier except at a narrow marginal edge which supports the length adjacent the anvil 53. On continued upward movement of the plate (by squeezing together the cassette and the plate 13) the anvil presses a portion of the adhesive tape length firmly against the non-oxide surface of the magnetic tape. During the squeezing action the presser plate 52 moves towards the magnetic tape and by way of the link 64 causes the rod 62 to move along its guide slot thus elevating the latter and the wheels 61 to a non-operative position clear of the adhesive tape just dispensed.

On release of the cassette and the plate 13 by the operator, the presser plate returns to a rest position under the action of a spring shown schematically at 65. The return movement of the presser plate causes the wheels 61 to drop back to their operative position.

As plate 13 is lowered to carry out the second cutting operation the adhesive strip is brought down with the magnetic tape and enters the groove 21b to overlay with the remaining portion of the strip the second end to be joined. The final pressing operation to bring the remaining portion of the adhesive strip into contact with the second end of the magnetic tape is carried out manually.

Figure 5:
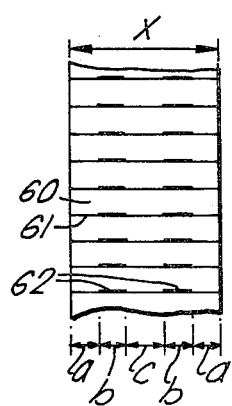
FIG. 5 is a plan of a portion of a tape comprising a series of pre-cut adhesive strips supported transversely on a carrier.
Figure 6:
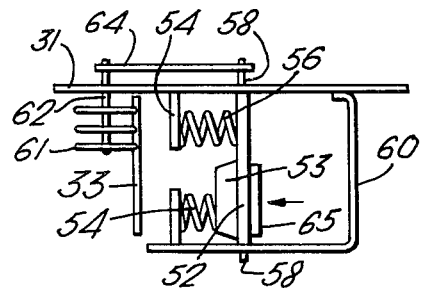
FIG. 6 is a part plan view taken in the direction of arrow D in FIG. 3 on an enlarged scale.

To ensure positive indexing of the step-by-step movement of the adhesive tape carrier the latter is preformed as shown in FIG. 5. The lengths 60 of adhesive tape are formed by passing a waxed carrier tape, having an adhesive plastic layer thereon, through a cutter which severs the adhesive layer along transverse lines 61 entirely through the layer. The cutter is so shaped that coincident with the lines 61 two slits 62 are provided in the carrier tape. The slits are spaced apart at a distance equal to the spacing of the two series of sprocket pins on the sprocket wheel 36. The sprocket can engage the slits during transport of the adhesive tape carrier thus preventing slip. Preferably the dimensions as shown in FIG. 5 are as follows: x=25.4 mm, a=5 mm, b=3 mm and c=9.4 mm.

Whilst the tape cutting angle of 45° is often preferred it should be noted that the invention may be adapted for any angle of cut. Normally the convenient angle of cut would lie in the range of 30° to 90° to the longitudinal axis of the tape.

In a further embodiment of the invention the actuating means may comprise a gearwheel or gearwheels on one, or the other or both of the cutting plates which will directly drive the take-up spool through suitable gearing.

I claim:

1. A method of joining together strip materials comprising providing a support member having mounted thereon a pair of cooperating cutting plates having aligned grooves formed respectively therein, placing a strip
   in the groove of one plate, effecting relative movement between the two plates to cut the strip at a first position to produce two cut ends, permitting a first cut end to be retained in the groove of said one plate, effecting movement of said one plate relative to the other plate in a direction to bring the groove of said one plate out of alignment with the groove of the other plate, placing the second cut end in the groove of the other plate, effecting relative movement between the two plates again to cut the strip material at a second position and to bring the ends of the strip material remaining in the grooves into abutting disposition, and applying an adhesive strip to the abutting ends.

2. An apparatus for joining together strip materials comprising a support and two pivotally mounted cutting plates carried by said support having cooperating cutting edges, said plates having aligned grooves formed respectively therein transversely of the cutting edges of said plates for reception of the strip material to be joined, whereby in use the strip to be cut is placed in the groove of one plate, relative movement is effected between the two plates to cut the strip at a first position to produce two cut ends, a first cut end is retained in the groove of said one plate and moved relative to the other plate in a direction to bring said first cut end out of alignment with the groove of the other plate, the second cut end is placed in the groove of the other plate, relative movement between the two plates is again effected to cut the strip material at a second position and to bring the ends of the strip material remaining in the grooves into abutting disposition for application of an adhesive joining strip.

3. An apparatus according to claim 2, wherein the grooves are inclined at an angle of 30° to 90°, preferably substantially 45°, to the cutting edges of the two plates.

4. An apparatus according to claim 2, wherein the two plates are pivotally mounted on a common shaft carried by said support and a spring urges said plates together.

5. An apparatus according to claim 2, including means for storing adhesive tape, means for dispensing adhesive tape lengths to said strip material longitudinally of the strip material to be joined, means for intermittently transporting said tape, pressure means for applying pressure to the dispensed length of adhesive tape to apply the latter to said strip material on relative movement between said pressure means and at least one of said plates, and actuating means engageable with one or other of the plates, on relative movement between said one or other plate and said actuating means, to transport said tape.

6. An apparatus according to claim 5, in which there is used adhesive tape carried in lengths disposed transversely of a carrier tape, wherein said transport means comprises a take-up spool, a ratchet wheel attached to said take-up spool, a pawl drivably engageable with said ratchet wheel, and a transmission mechanism connected between said actuating means and said pawl, depression of said actuating means by said one or other plate causing the tape carrier to be moved a distance equal to the width of the adhesive tape lengths and on successive depression dispense successive adhesive strip lengths and to bring them into alignment with the grooves in the plates at each joining operation.

7. An apparatus according to claim 6, wherein the means for dispensing tape lengths comprises a delivery plate about which the carrier tape is drawn to cause each adhesive tape length in turn to peel therefrom.

8. An apparatus according to claim 6, wherein said take-up spool includes a sprocket wheel having two series of pins engageable with pre-formed slits in said carrier tape.

9. An apparatus according to claim 5, wherein said pressure means comprises a spring-loaded pressure plate carrying an anvil of elastomeric material.

10. An apparatus according to claim 9, including a rotary guide movable from an operative position to guide said adhesive tape as it leaves its carrier to an inoperative position clear of the dispensed adhesive tape lengths to permit a portion of the latter to be applied to the strip material by the anvil without interference with the remaining portion of the adhesive tape length.

11. An apparatus according to claim 10, wherein said rotary guide is movable along an inclined guide slot, means being connected between said rotary guide and the pressure plate to effect drive of said rotary guide to its inoperative position on displacement of said pressure plate relative to said one cutting plate.

* * * * *